United States Patent
Lupu

(10) Patent No.: US 7,322,121 B1
(45) Date of Patent: Jan. 29, 2008

(54) DEVICE FOR CHECKING CHAMFERS AND RADII

(76) Inventor: Ioan-Ilie Lupu, 25 Williams Street, Markham (CA) L6C 0C3

(*) Notice: Subject to any disclaimer, the term of this patent is extended or adjusted under 35 U.S.C. 154(b) by 25 days.

(21) Appl. No.: 11/473,855

(22) Filed: Jun. 23, 2006

(51) Int. Cl.
*G01B 3/22* (2006.01)
*G01B 5/00* (2006.01)

(52) U.S. Cl. .......................................... 33/833; 33/832
(58) Field of Classification Search .............. 33/1 SP, 33/520, 530, 549, 555.1, 832, 833
See application file for complete search history.

(56) References Cited

U.S. PATENT DOCUMENTS

| | | | | |
|---|---|---|---|---|
| 4,554,747 A | * | 11/1985 | Williams | 33/832 |
| 4,831,742 A | * | 5/1989 | Struble | 33/832 |
| 4,942,672 A | * | 7/1990 | Yoshida | 33/832 |
| 5,657,550 A | * | 8/1997 | Struble | 33/548 |
| 5,714,686 A | | 2/1998 | Penjaska | |
| 5,979,069 A | * | 11/1999 | Hayashida et al. | 33/832 |
| 6,205,672 B1 | | 3/2001 | Paulsen et al. | |
| 6,766,583 B2 | | 7/2004 | Economaki | |
| 6,802,133 B2 | * | 10/2004 | Jordil et al. | 33/832 |
| 2005/0166415 A1 | * | 8/2005 | Kiwada et al. | 33/613 |

* cited by examiner

*Primary Examiner*—G. Bradley Bennett
(74) *Attorney, Agent, or Firm*—Sand & Sebolt

(57) ABSTRACT

A device for checking the chamfer and/or radius of a corner of an object includes a housing having a pair of right angled surfaces at one end thereof for placement against right angled surface of the corner of the object having a chamfer or radius extending between the right angled surfaces. A sensing slide bar having a known angled distal end is slidably mounted in the housing and extends outward from the housing and is engageable with the chamfer or radius. The length of the outward extension of the slide bar is measured by a microprocessor in the housing and provides a digital display on the housing with a readout correlating to the chamfer or radius of the object's corner contacted by the angled distal end of the slide bar.

14 Claims, 12 Drawing Sheets

DETAIL A

DEVICE FOR CHECKING CHAMFERS AND RADII

BACKGROUND OF THE INVENTION

1. Technical Field

The invention relates to devices for checking a chamfer and radius of a corner surface. More particularly, the invention relates to an electronic device which provides a visual display, preferably in the form a digital readout, of certain characteristics of a chamfer and/or radius of a corner of an object on which the device is placed.

2. Background Information

It is difficult to check and measure small chamfers and small radii in making injection tooling and other machined and manufactured products. There are existing template gauges and other devices that can be placed on the chamfer and visually compared to the actual chamfer angle and length. There are also devices such as a mechanical or electronic calipers which measure across the small flat surface of the chamfer to measure its length. However, this is often difficult due to limited access for the measuring gauge when checking the radii and chamfers in holes or other locations on the object being measured.

There are also electronic digital calipers which incorporate a simple electronic sensor that reads a sensing strip placed on a moving arm of the caliper which provides the position on the strip or the distance that the strip has moved from the device. This distance is translated into an electronic digital display by a microprocessor contained in the caliper and provides a reading in metric, SAE or other format as selected by the user. However, these digital calipers are used to provide the depth of an opening or distance between two surfaces and do not provide an accurate readout as to characteristics of a chamfer, such as its length, and the length of a radius at a corner round of an object. Furthermore, many of these prior art electronic measuring devices are relatively bulky and complicated devices, two examples of which are shown in U.S. Pat. Nos. 6,766,583 and 6,205,672. Another type of mechanical chamfer gauge is shown in U.S. Pat. No. 5,714,686.

Therefore, the need exists for a relatively simple and inexpensive electronic device which can measure various characteristics of a chamfer and/or the radius of a curved surface at a corner round with the same tool, not believed possible with existing measuring devices.

BRIEF SUMMARY OF THE INVENTION

One aspect of the present invention is to provide for a relatively simple, inexpensive, lightweight and easily used device which provides an electronic digital readout in various modes, such as metric or SAE, to indicate various characteristics of a chamfer, such as its length, as well as the arcuate length or radius of a curved corner surface or round with the same device.

A further aspect is to provide such a device for checking the chamfer and/or radius of a corner round of an object by incorporating a pair of right angle surfaces at a lower end of a housing in which a sliding sensing bar is mounted, the extended position of the bar being sensed by an internal microprocessor which provides a digital readout of the chamfer or radius depending upon the extended length of the slide bar with respect to the right angled surfaces at the lower end of the housing.

Another feature of the present invention is to use existing electronic technology, such as providing a digital output reading of the relative position of a slide sensing bar by an intervening microprocessor incorporated into the tool, which technology is relatively inexpensive and simple to use, and which provides an automatic readout as to certain characteristics of a chamfer or radius, and in which the sliding bar or distal end thereof is changeable to enable the device to be used for different chamfer angles adding to the versatility the device.

Still another feature of the invention is to provide such a device in which the microprocessor can be programmed to incorporate various reference tables, that depending upon a readout mode selected on a display panel, provides certain characteristics of the chamfer and/or radius of a corner round.

Another aspect of the present invention is to provide a device for checking the chamfer and radius of an object in a simple, effective and efficient manner in a low cost, manually operated lightweight hand tool, not believed possible with prior art electronic calipers and measuring devices.

These objects and features are obtained by the device of the present invention which device checks for chamfer characteristics and the radius of a corner round which comprises, a housing having upper and lower ends, the lower end having first and second surfaces extending at right angles to each other for placement against right angle surfaces of the corner of an object; a sensing slide bar slidably mounted in the housing and projecting outwardly from the lower end of the housing toward the first and second surfaces, said slide bar having an angled distal end; a sensor within the housing for sensing the location of the slide bar with respect to the first and second surfaces when the angled distal end of the slide bar engages the chamfer or radius; and a display on the housing displaying the relative position of the slide bar indicating a characteristic of the chamfer or radius of the objects.

BRIEF DESCRIPTION OF THE SEVERAL VIEWS OF THE DRAWINGS

A preferred embodiment of the invention, illustrated of the best mode in which Applicant contemplates applying the principles, is set forth in the following description and is shown in the drawings and is particularly and distinctly pointed out and set forth in the appended claims.

Similar numbers refer to similar parts throughout the drawings.

DETAILED DESCRIPTION OF THE INVENTION

Figure 5:
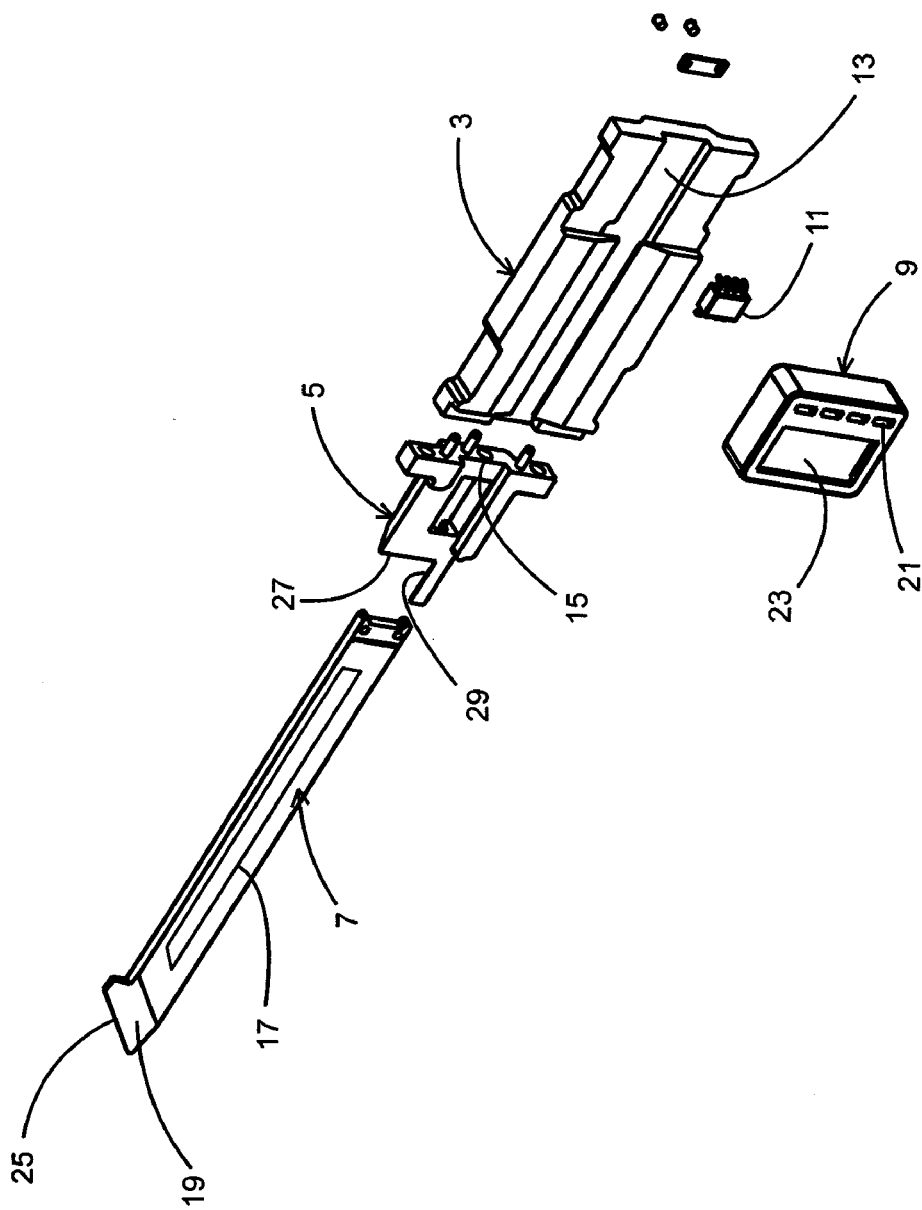
FIG. 5 is an exploded perspective view of the sensing device.

The measuring device of the present invention is indicated generally at 1, and is shown assembled particularly in FIGS. 1-4, and disassembled in FIG. 5. Device 1 includes as its main components a housing 3, a positioning block 5 forming a lower end of housing 3, a slide bar 7, a display panel 9 and a microprocessor 11.

Housing 3 can take various shapes, but preferably is an elongated relatively thin member formed of metal or plastic material having an internal slide channel 13 which extends generally throughout the length thereof, which channel communicates with another slide channel 15 formed in positioning block 5. Slide bar 7, which is an elongated strip of metal or plastic, is complementary to slide channels 13 and 15 and is slidably mounted in the two aligned channels. Sliding friction between bar 7 and the slide channels maintains slide bar 7 in an extended position when in operation as shown particularly in FIGS. 7-12. A sensing strip 17 or other type of position detective device is mounted on slide bar 7 which interacts with a reader on microprocessor 11 which reads the longitudinal position of slide bar 17 in slide channels 13 and 15, and in particular, the outward extent of the distal end 19 from beyond positioning block 5. This type of sensing strip or mechanism is currently used in electronic calipers and is known to those skilled in the prior art of electronic measurement devices, and thus is not described in further detail.

Display panel 5 preferably includes a plurality of buttons collectively indicated at 21, which are mounted on the front face of panel 5 to provide various functions to device 1. For example, one of the buttons can be used as an ON/OFF switch, a second button to determine whether the device is in a chamfer or radius measurement mode, a third button could be a reset button and the fourth button could determine the particular form of the digital display appearing on a readout screen 23, such as whether the measurement is in metric or SAE format.

Figure 6:
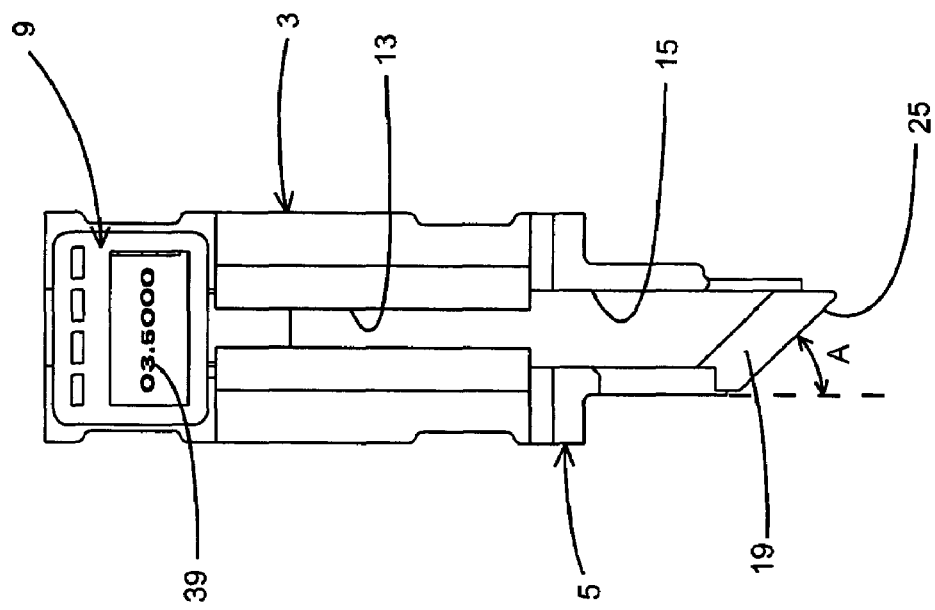
FIG. 6 is an elevational view of the sensing device similar to FIG. 3 with the sensing slide bar in an extended measuring position.

Distal end 19 has an angled contact surface 25 having a known angle such as indicated at Arrow A in FIG. 6. Either distal end 19, and in particular contact surface 25, is replaceable to change the angle of surface 25, or slide bar 7 is replaceable in order to vary the contact surface angle. A 45° angle is the most common angle used for most chamfer surfaces, although 22.5° and 67.5° are also standard chamfer angles. However, it is readily understood that angled surface 25 on the distal end of slide bar 7 can be any angle if desired, depending upon the particular application with which device 1 will be used.

Figure 1:
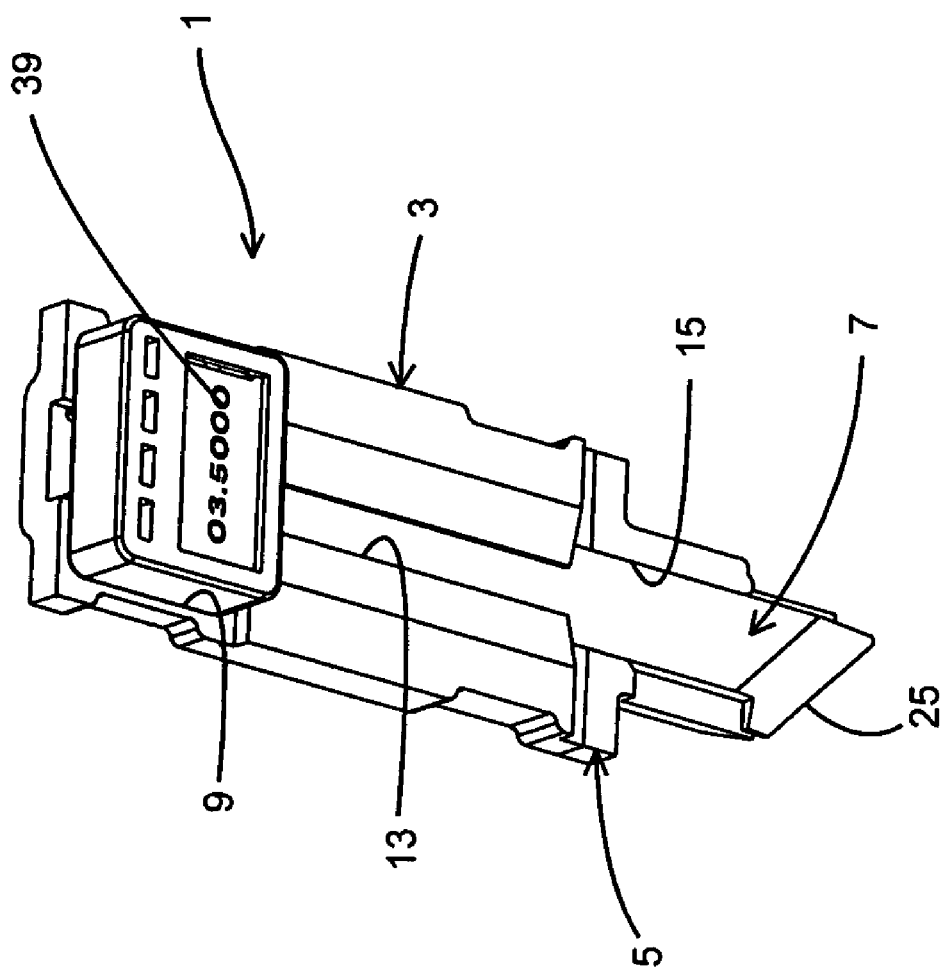
FIG. 1 is a perspective view of the measuring device of the present invention.
Figure 2:
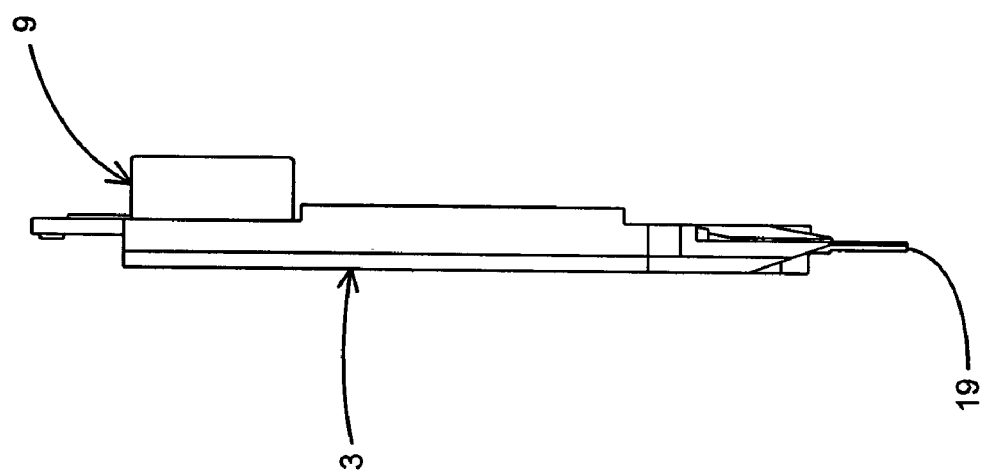
FIG. 2 is a side elevational view of the measuring device of FIG. 1.
Figure 3:
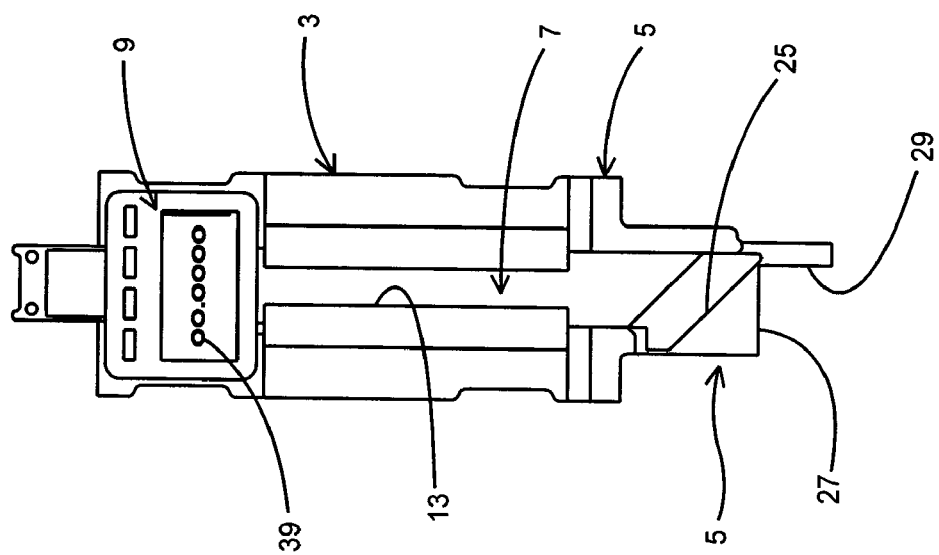
FIG. 3 is a front elevational view of the measuring device with the sensing bar in retracted position.
Figure 4:
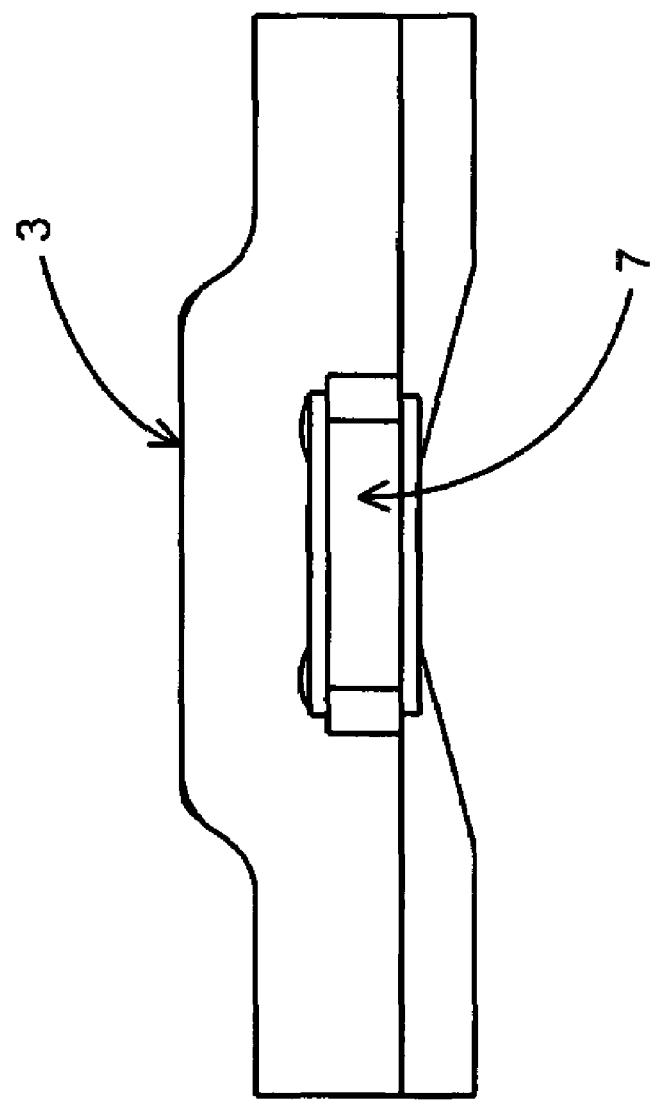
FIG. 4 is a top plan view of the sensing device.
Figure 7:
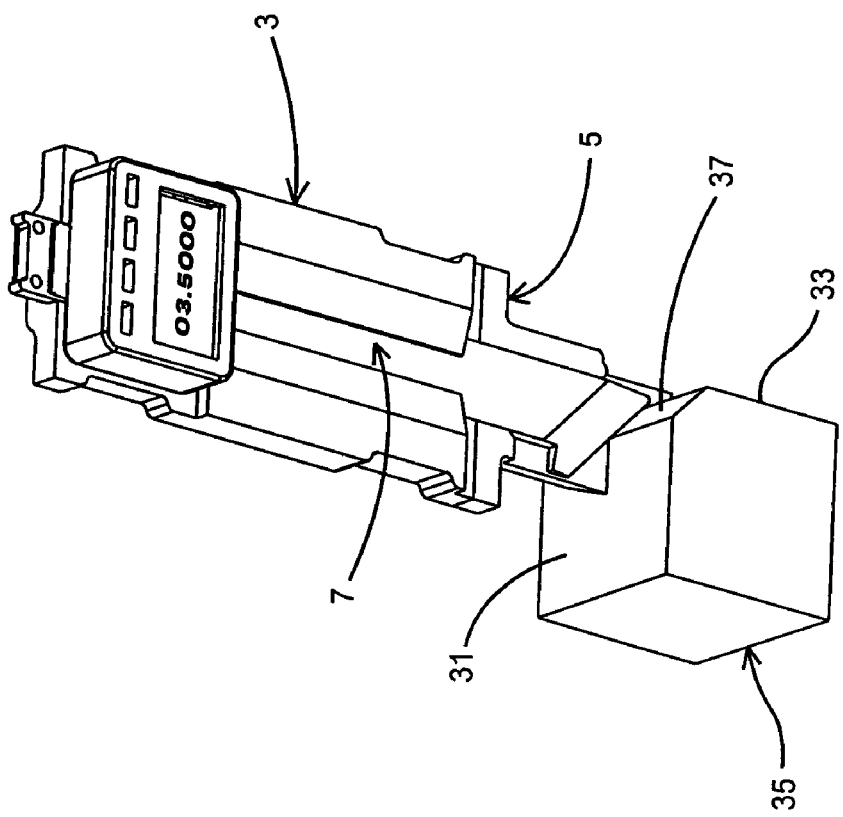
FIG. 7 is a perspective view showing the measuring device checking the chamfer of an object.
Figure 8:
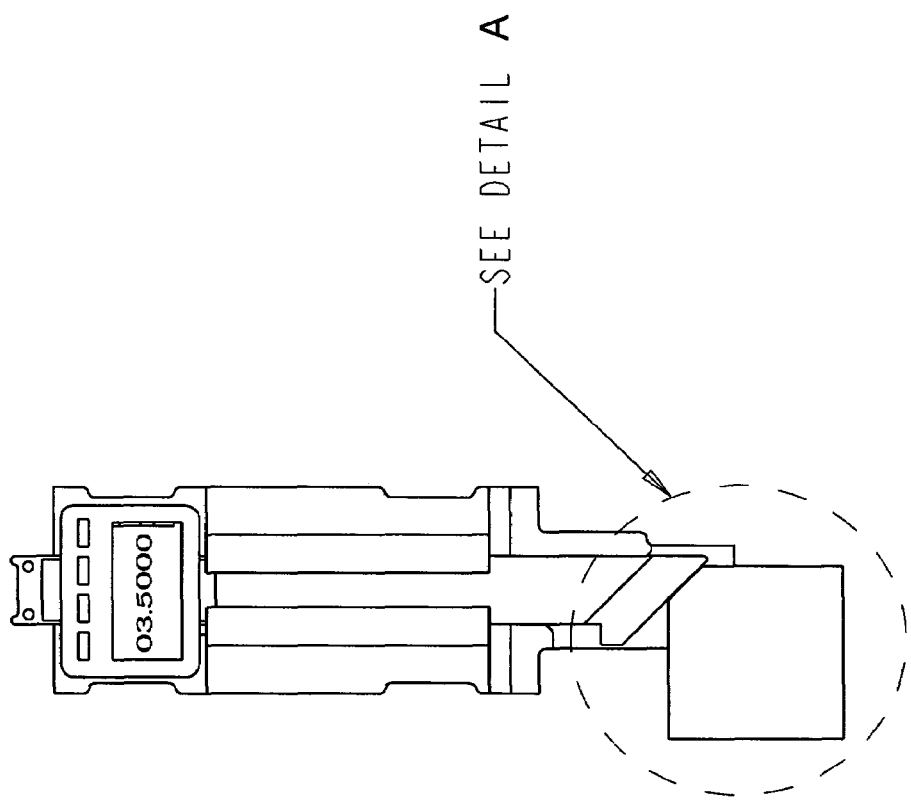
FIG. 8 is an elevational view of the measuring device shown in FIG. 7 measuring the chamfer of an object.
Figure 9:
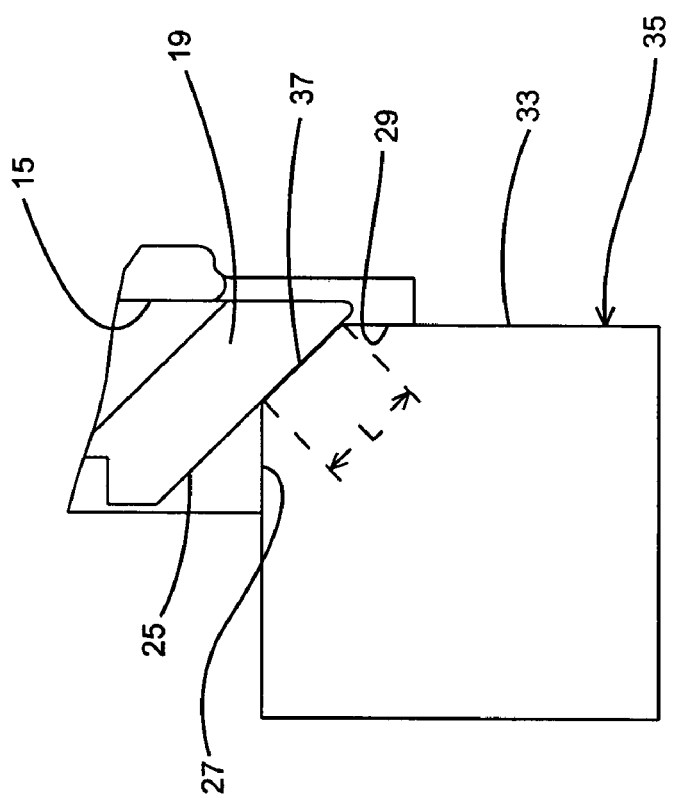
FIG. 9 is an enlarged fragmentary elevational view of the encircled portion of FIG. 8.

Referring to FIG. 3, and in accordance with the main feature of the invention, positioning block 5 is formed with a pair of right angled surfaces 27 and 29 providing the right angled corner therebetween. These right angled surfaces are placed against the right angled surfaces 31 and 33 of an object 35 having a chamfer 37 formed therein to be checked by device 1. As best illustrated in FIGS. 7, 8 and 9, positioning block 5 is placed into abutment with object 35 with right angled surfaces 27 and 29 of positioning block 5 abutting and aligning with right angled surfaces 31 and 33 respectively, of object 35. After being placed in this position, slide bar 7 is moved downwardly outwardly from the lower end of housing 3 from its retracted position as shown in FIG. 3 to its extended engaged position with object 35. The distance that slide bar 7, and in particular distal end 19 travels until it engages and rests upon chamfer 37 as shown in FIG. 9, is sensed by microprocessor 11. This provides a digital readout 39 which may indicate the length L (FIG. 9) of chamfer 37 since the angle of contact surface 25 is known and by simple conversion formulas easily incorporated and calculated by microprocessor 11, provides the desired reading. For example, if the length L of chamfer 37 is known for a particular tool or part being developed and if the readout 29 does not match the required readout, the toolmaker knows immediately that the correct chamfer needed for the particular tool or object has not been achieved and will continue to modify the chamfer until the desired reading is obtained by device 1. It is readily understood that for another tool or object, the angle of the chamfer could be 22.5° and thus would only require the replacement of slide bar 7, and in particular contact surface 25 thereof, with the matching angle of the chamfer intended for object 35.

Figure 10:
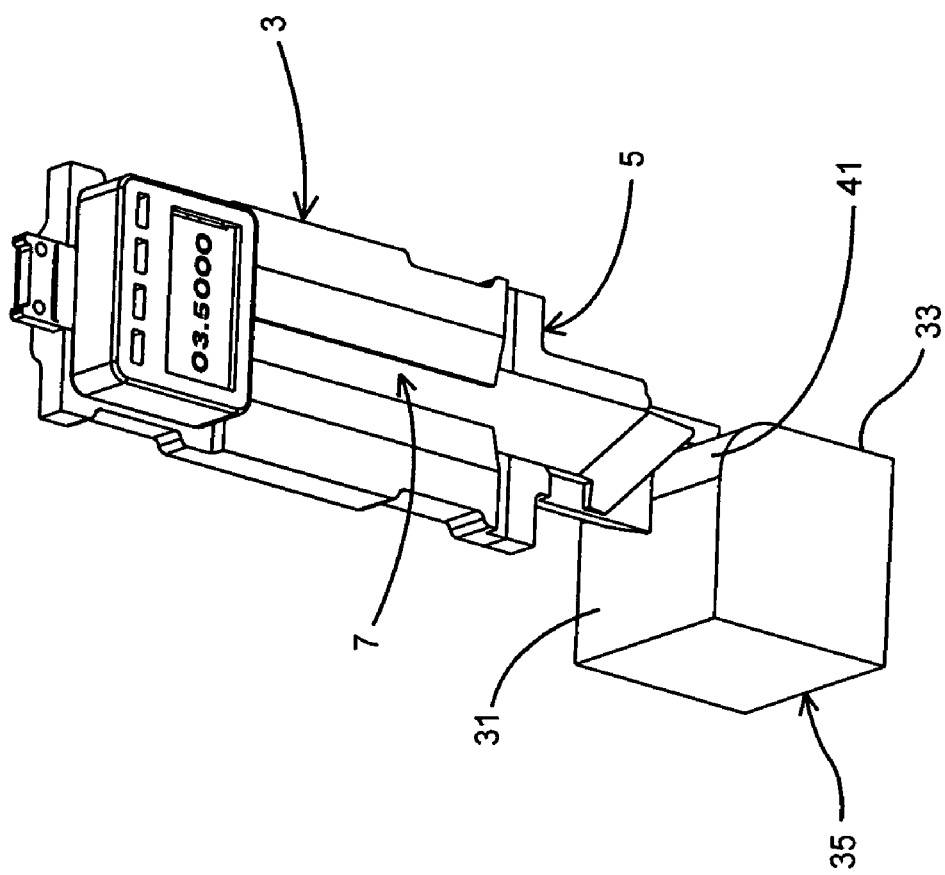
FIG. 10 is a perspective view similar to FIG. 7 showing the measuring device checking the radius of an object.
Figure 11:
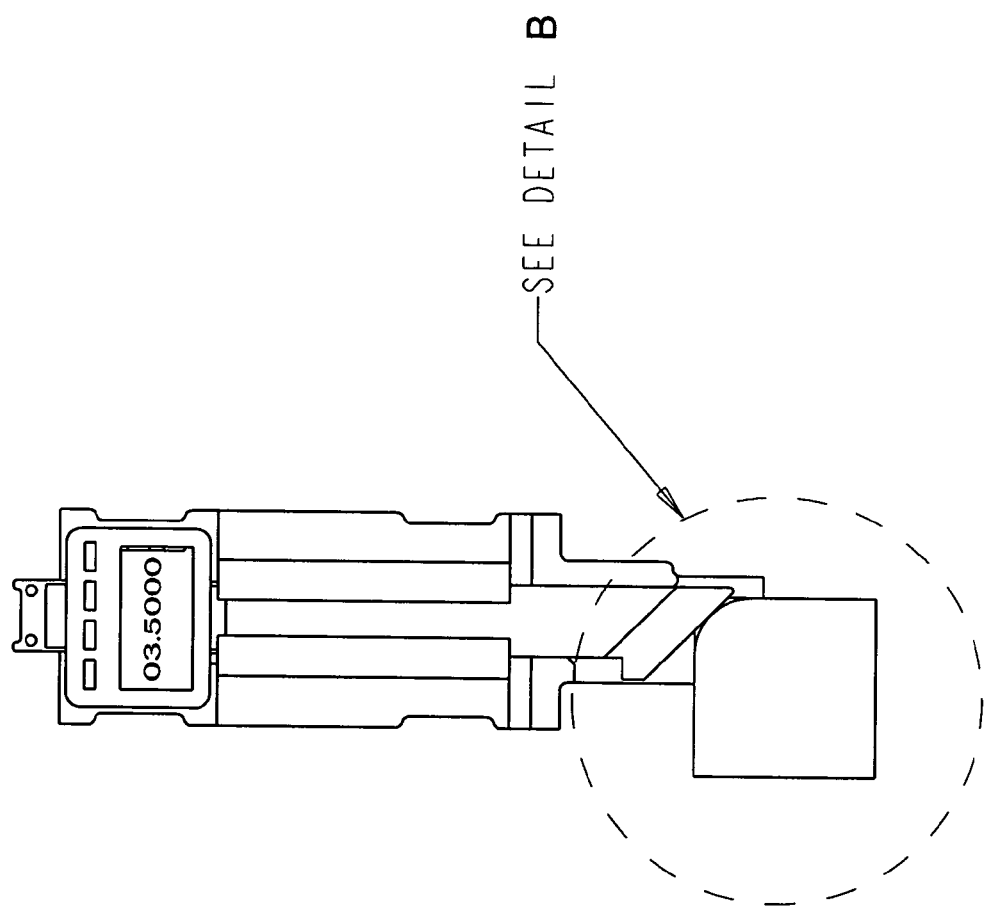
FIG. 11 is a front elevational view showing the measuring device measuring the radius of an object as shown in FIG. 10.
Figure 12:
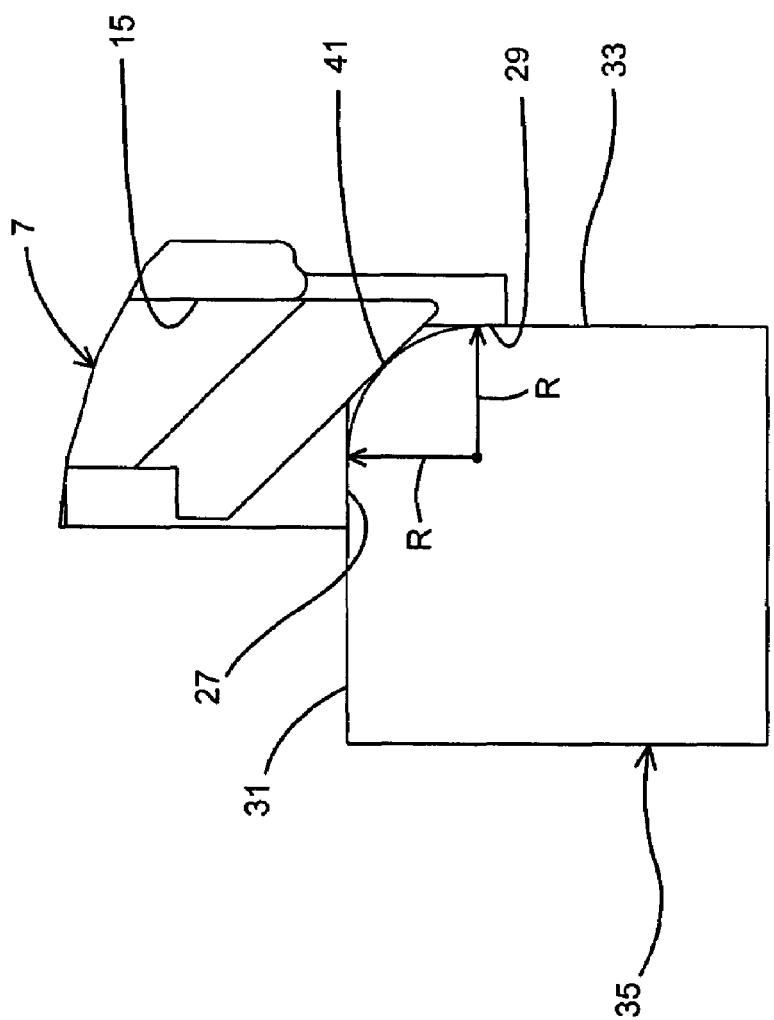
FIG. 12 is an enlarged fragmentary front elevational view of the encircled portion of FIG. 11.

Device 1 also can be used without modification except for the programming of microprocessor 11, for measuring the radius of a corner round as shown in FIGS. 10-12. Again, for certain objects 35 instead of a chamfer 37 being formed thereon a corner round 41 is used having a certain arcuate length or radius as shown in FIG. 12. When used for measuring or checking corner rounds 41, slide bar 7 is moved outwardly from housing 3 until angled contact surface 25 contacts the round, and in particular, the point of tangency thereof as shown in FIG. 12. The microprocessor then will provide a readout based upon the distance that bar 7 extends outwardly from housing 3 with respect to positioning block 5. Again, it is known what the digital readout 39 should be if the correct corner round has been formed on object 35. If the reading provided by device 1 does not match this known reading, round 41 would be further refined until the desired radius or arcuate length has been formed on object 35. Again, slide bar 7, and in particular, angled contact surface 25 is replaceable for various angles for measuring various corner rounds. However, the 45° angled surface 25 will be the main angle used for measuring corner rounds, as well as for most chamfers. Again, this measurement system is dependent upon the engagement of right angled surfaces 27 and 29 of positioning block 5 with right angled surfaces 31 and 33 of object 35 as shown in FIGS. 10-12.

Thus, the device of the present invention provides a relatively simple tool which is extremely accurate for determining characteristics of a chamfer and corner round on an object, and in particular, for determining whether the chamfer and corner round have been formed to a desired condition, which is readily determined upon the digital readout 39 matching the known readout that should be achieved by device 1. Again, the internal conversion tables programmed into microprocessor 11 can be of various forms and provide various readings which are correlated with the extended length of slide bar 7 in order to verify that the correct chamfer 37 and corner round 41 has been formed on object 35. It is also understood that the conversion tables can be designed in such a manner that upon contact of angled surface 25 with chamfer 37 or corner round 41 it provides a readout indicating the chamfer length if previously unknown, as well as the radius R of the corner round. Thus, it can be used as a measuring device as well as a checking device for chamfers and corner rounds without affecting the concept of the invention and the manner of use of device 1.

One example of a type of electronic circuitry that can be used in device 1 is shown in U.S. Pat. No. 6,205,672, with examples of conversion tables of the type that can be used in device 1 being shown in U.S. Pat. No. 6,766,583. Again, the particular conversion tables can be easily developed by those skilled in the art to provide the desired digital readout based upon the extended position of slide bar 7, and in particular, sensing strip 17 mounted thereon, which position is detected and read by an internal mechanism associated with microprocessor 11.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A device for checking a chamfer and/or radius formed on a corner of an object between right angled surfaces of said corner, said device comprising:
   a housing having upper and lower ends, said lower end having first and second surfaces extending at right angles to each other for placement against the right angle surfaces at the corner of the object;
   a sensing slide bar slidably mounted in the housing and projecting outwardly from the lower end of the housing toward the first and second surfaces of the housing, said slide bar having a known angled distal end;
   a sensor within the housing for sensing the location of the slide bar with respect to the first and second surfaces of the housing when the angled distal end of the slide bar engages the chamfer and/or radius; and
   a display on the housing providing a readout indicating a characteristic of the chamber or radius formed at the corner of the object.

2. The device defined in claim 1 wherein the housing display provides a digital readout.

3. The device defined in claim 1 wherein the distal end of the slide bar extends at an angle of 45°.

4. The device defined in claim 1 wherein the distal end of the slide bar extends at an angle of 22.5° or 67.5°.

5. The device defined in claim 1 wherein a plurality of selector switches are provided on the housing for selecting a display mode for the housing display.

6. The device defined in claim 5 wherein one of the selector switches enables for the display mode to provide the length of the chamber in metric or SAE.

7. The device defined in claim 5 wherein one of the selector switches enables the display mode to provide the curvature of the radius in degrees.

8. The device defined in claim 5 wherein one of the selector switches is an ON/OFF switch.

9. The device defined in claim 1 wherein the angle of the distal end of the slide bar is variable for checking chamfers of various angles.

10. A method of checking a chamfer and/or a corner round formed on a corner of an object including the steps of:
    placing a device having a digital readout so that a pair of right angled surfaces on the device abut against a pair of right angled surfaces forming the corner of the object having the chamfer and/or corner round;
    moving a sensing bar out of the device until an angled distal end of the bar engages the chamfer and/or a corner round formed between the pair of right angled surfaces of the object;
    sensing the position of the bar and providing a signal to a processor operationally connected to the bar, wherein the processor converts the signal to a digital readout; and
    displaying the digital readout on a digital display indicating the length of the chamfer and/or radius of the corner round.

11. The method defined in claim 10 including the step of selecting a particular mode for the digital readout.

12. The method defined in claim 11 including the step of displaying the readout in a metric or SAE mode.

13. The method defined in claim 10 including the step of replacing the distal end of the sensing bar with a variety of angled surfaces.

14. The method defined in claim 10 including the step of providing the distal end of the sensing bar with an angle of 45°.

* * * * *